United States Patent
Yang

(10) Patent No.: US 7,460,380 B2
(45) Date of Patent: Dec. 2, 2008

(54) HIGHLY EFFICIENT SWITCHING POWER CONVERTER USING A CHARGE PUMP TO POWER THE DRIVE CIRCUIT

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 246 days.

(21) Appl. No.: 11/426,318

(22) Filed: Jun. 26, 2006

(65) Prior Publication Data
US 2007/0297197 A1 Dec. 27, 2007

(51) Int. Cl.
*H02M 3/335* (2006.01)
(52) U.S. Cl. .............................. 363/131; 363/16; 363/97
(58) Field of Classification Search ............. 363/15–17, 363/24–26, 95, 97–98, 131–132, 134
See application file for complete search history.

(56) References Cited

U.S. PATENT DOCUMENTS

| | | | | |
|---|---|---|---|---|
| 4,403,269 A | * | 9/1983 | Carroll | 361/91.7 |
| 4,754,385 A | * | 6/1988 | McDade et al. | 363/16 |
| 4,768,141 A | * | 8/1988 | Hubertus et al. | 363/16 |
| 5,047,911 A | * | 9/1991 | Sperzel et al. | 363/56.01 |
| 5,231,563 A | * | 7/1993 | Jitaru | 363/98 |
| 5,838,558 A | * | 11/1998 | Tan et al. | 363/91 |
| 6,081,434 A | * | 6/2000 | Kinoshita et al. | 363/24 |
| 6,201,717 B1 | * | 3/2001 | Grant | 363/60 |
| 6,324,077 B1 | * | 11/2001 | Lopresti et al. | 363/16 |
| 6,744,649 B1 | * | 6/2004 | Yang et al. | 363/98 |
| 6,952,354 B1 | * | 10/2005 | Yang et al. | 363/16 |
| 7,061,776 B2 | * | 6/2006 | Yang et al. | 363/16 |
| 2005/0152158 A1 | * | 7/2005 | Gut et al. | 363/16 |
| 2006/0262581 A1 | * | 11/2006 | Lin | 363/132 |
| 2007/0297197 A1 | * | 12/2007 | Yang | 363/16 |

* cited by examiner

*Primary Examiner*—Jeffrey L Sterrett
(74) *Attorney, Agent, or Firm*—Jianq Chyun IP Office

(57) ABSTRACT

A switching power converter having a first and a second transistor are connected in series with the transformer to provide higher switching efficiency. A charge pump circuit is coupled to a drive circuit to provide a power source for driving the first transistor. A third transistor is connected between the transformer and the ground to help the switching of the transformer and the charge of the charge pump circuit. A switching control circuit is coupled to the output of the switching power converter to generate a first switching signal and a second switching signal for regulating the switching power converter. The first switching signal is coupled to drive the first transistor and the second transistor. The second switching signal is coupled to drive the third transistor.

6 Claims, 6 Drawing Sheets

HIGHLY EFFICIENT SWITCHING POWER CONVERTER USING A CHARGE PUMP TO POWER THE DRIVE CIRCUIT

BACKGROUND OF THE INVENTION

1. Field of the Invention

The present invention relates to power converters, and more particularly, to the switching power converters and switching regulators.

2. Description of Related Art

Power converters have been used to convert an unregulated power source to a regulated voltage and/or current source. The transformer of the power converter is equipped to provide the isolation between the input power source and the application apparatus for the safety purpose. FIG. 1 shows a traditional switching power converter. A transistor 5 is connected to the primary winding NP of a transformer 40 for switching the transformer 40. The secondary winding NS of the transformer 40 thus generates a power source coupled to the output of the switching power converter through a rectifier-and-filter 50. Due to the geometrical limitation of the transformer, a leakage inductor 45 will be generated in the transformer 40. The inductance $L_L$ of the leakage inductor 45 means the energy that cannot be transferred to the secondary winding NS of the transformer 40. A worse coupling between the primary winding and the secondary winding will cause a higher leakage inductance of the transformer. Therefore, a smaller transformer generally includes a higher leakage inductance. The power $P_L$ produced by the leakage inductor 45 can be expressed as, $$P_L = \frac{1}{2} \times L_L \times I_M^2 \times F_S \qquad (1)$$

wherein the $I_M$ is the switching current of the transformer 40; the $F_S$ is the switching frequency for the switching power converter.

A diode 70, a resistor 71 and a capacitor 72 form a snubber circuit and consume the power caused by the leakage inductor 45. Otherwise, the energy of the leakage inductor 45 will become a surge voltage to stress the transistor 5.

Equation 1 shows the power loss of the leakage inductance increased in response to the increase of the switching frequency. Therefore, how to save the power of the leakage inductance becomes a major concern of power saving, especially for the switching power converter including a small transformer and high switching frequency.

SUMMARY OF THE INVENTION

The present invention provides a method and apparatus to save the power of the leakage inductance and achieve higher efficiency for the switching power converter. It comprises a first transistor connected from the input voltage of the switching power converter to a first terminal of the primary winding of the transformer. A second transistor is connected from a second terminal of the primary winding of the transformer to the ground. A first diode is connected from the second terminal of the primary winding to the input voltage. A second diode is coupled from the ground to the first terminal of the primary winding. A third transistor is coupled from the first terminal of the primary winding to the ground. A drive circuit is coupled to the first terminal of the primary winding and the first transistor for driving the first transistor. A charge pump circuit is connected to the drive circuit to provide a power source to the drive circuit. A switching control circuit coupled to the output of the switching power converter to generate a first switching signal and the second switching signal for regulating the switching power converter. The first switching signal is coupled to drive the first transistor and the second transistor with a first pulse width. The second switching signal is coupled to drive the third transistor with a second pulse width.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE PREFERRED EMBODIMENT

Figure 1:
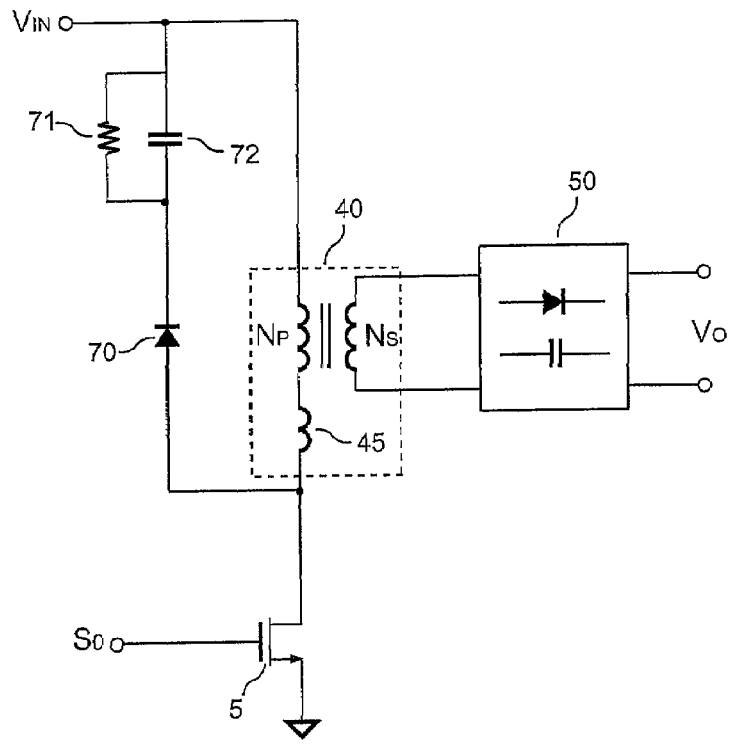
FIG. 1 shows a traditional switching power converter.
Figure 2:
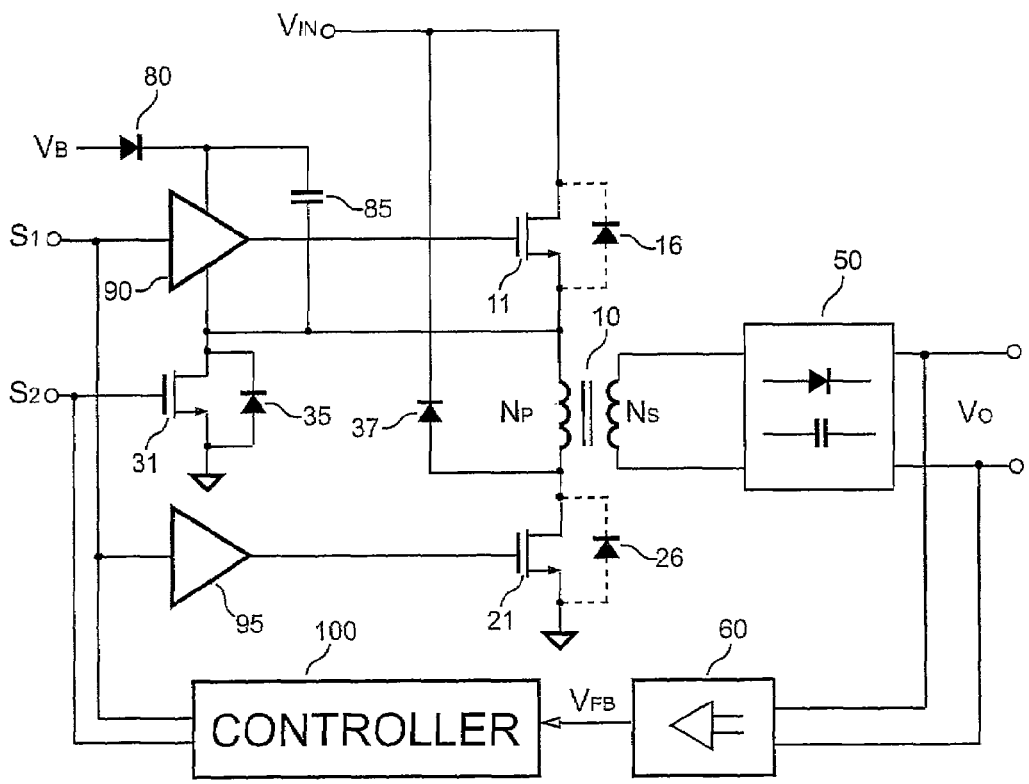
FIG. 2 is a schematic circuit of a high efficiency switching power converter according to an embodiment of the present invention.

FIG. 2 shows a switching power converter according to an embodiment of the present invention. The switching power converter can be a power converter or a switching regulator. A transformer 10 includes a primary winding $N_P$ and a secondary winding $N_S$. The primary winding $N_P$ of the transformer 10 has a first terminal and a second terminal. The secondary winding $N_S$ of the transformer 10 is coupled to the output of the switching power converter through the rectifier-filter 50. A transistor 11 is connected from an input voltage $V_{IN}$ to the first terminal of the primary winding $N_P$. The transistor 11 includes a parasitic diode 16. A transistor 21 is connected from the second terminal of the primary winding $N_P$ to the ground. The transistor 21 includes a parasitic diode 26. A diode 37 is connected from the second terminal of the primary winding $N_P$ to the input voltage $V_{IN}$. A diode 35 is coupled from the ground to the first terminal of the primary winding $N_P$. A transistor 31 is coupled from the first terminal of the primary winding $N_P$ to the ground. A drive circuit 90 is coupled to the first terminal of the primary winding $N_P$ and the transistor 11 for driving the transistor 11. A buffer circuit 95 is connected to the transistor 21 for driving the transistor 21. A diode 80 is connected from a supply voltage $V_B$ to a capacitor 85. The diode 80 and the capacitor 85 form a charge pump circuit connected to the drive circuit 90 to provide a power source to the drive circuit 90. The supply voltage $V_B$ will charge the capacitor 85 through the diode 80 when the transistor 31 is turned on. A switching control circuit 100 is coupled to the output $V_O$ of the switching power converter through a secondary circuit 60. The secondary circuit 60 is utilized to generate a feedback signal in accordance with the output of the switching power converter. The device of the secondary circuit 60, such as optical-coupler, will provide the isolation. The switching control circuit 100 generates a switching signal $S_1$ and a switching signal S2 according to the feedback signal $V_{FB}$ for regulating the output of the switching power converter. The switching signal $S_1$ is coupled to drive the transistor 11 and the transistor 21. The switching signal $S_2$ is coupled to drive the transistor 31.

Figure 3A:
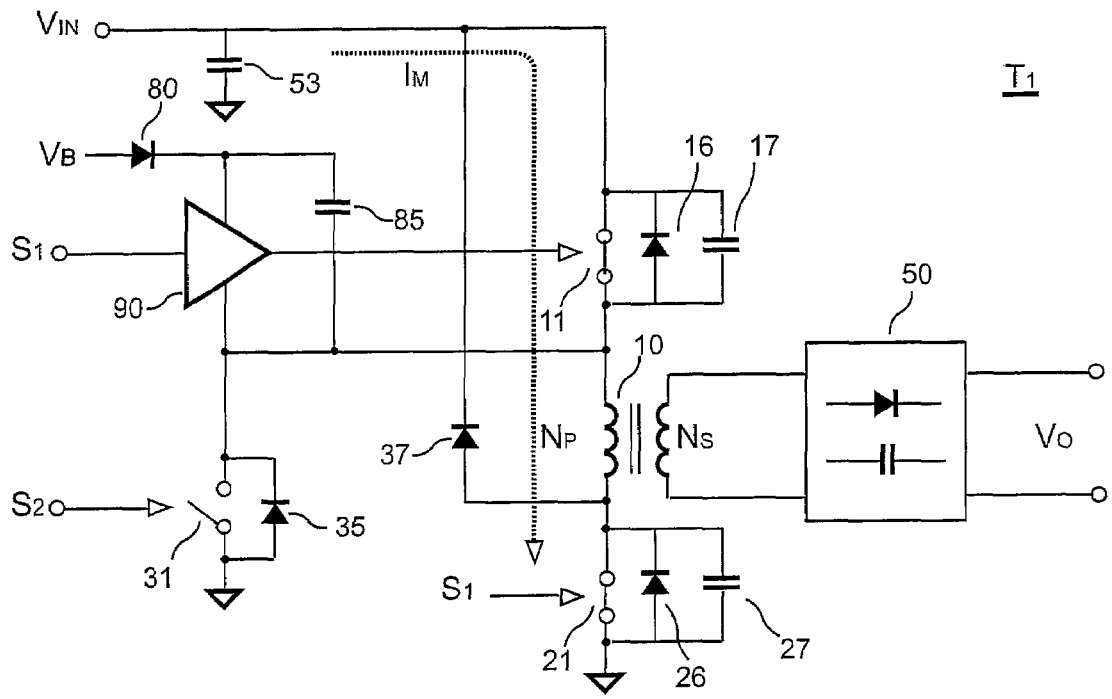
FIG. 3A-3E show operation stages of each switching cycle of the switching power converter according to an embodiment of the present invention.
Figure 3B:
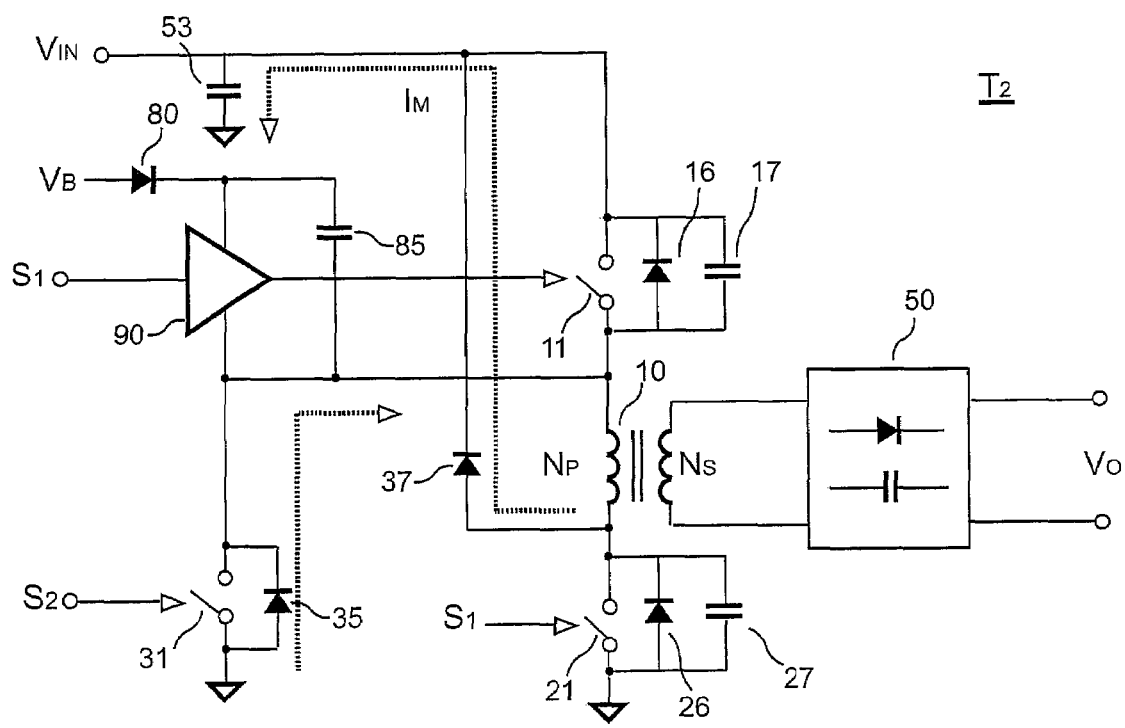
Figure 3C:
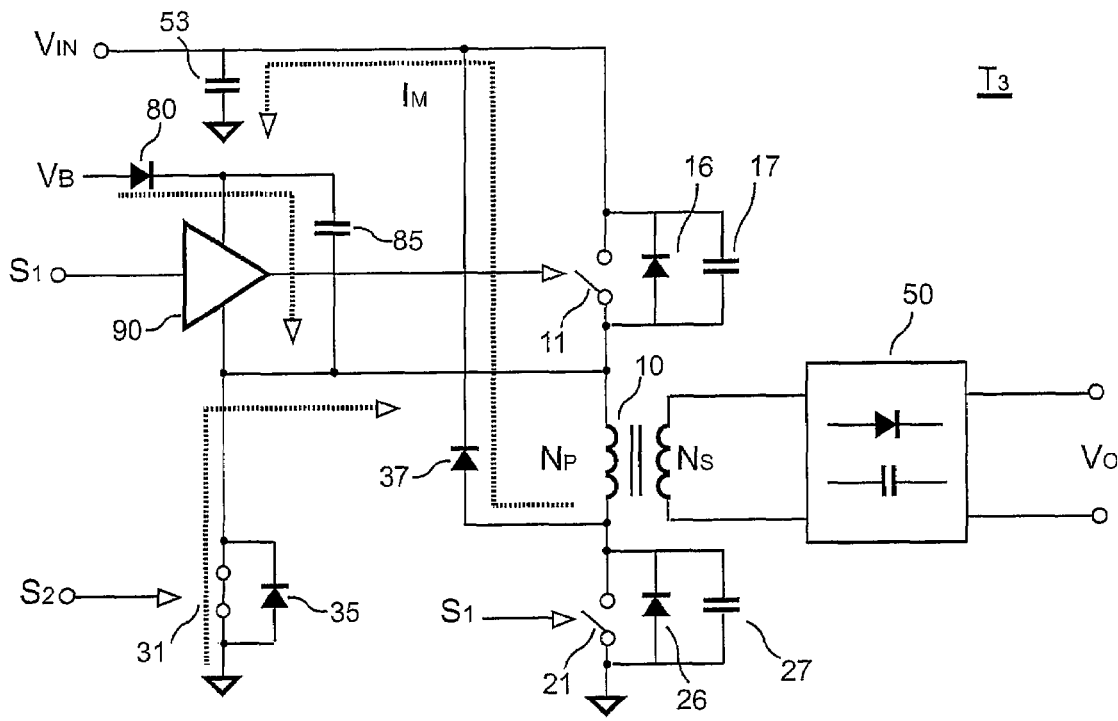
Figure 3D:
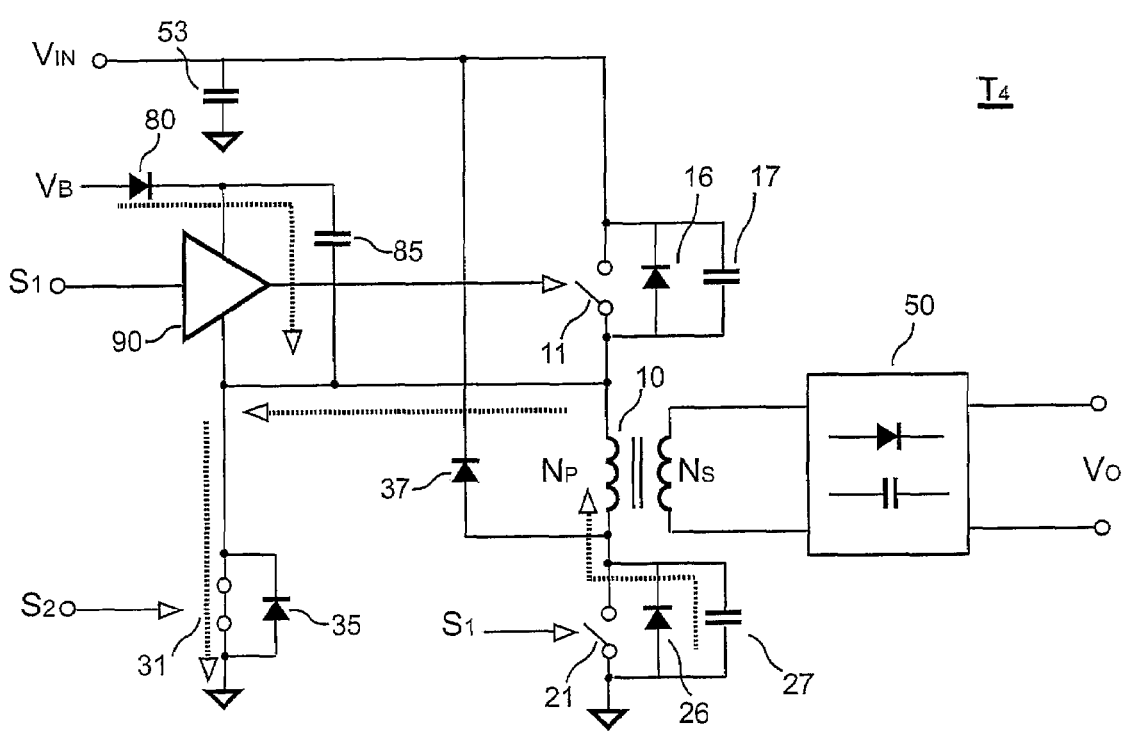
Figure 3E:
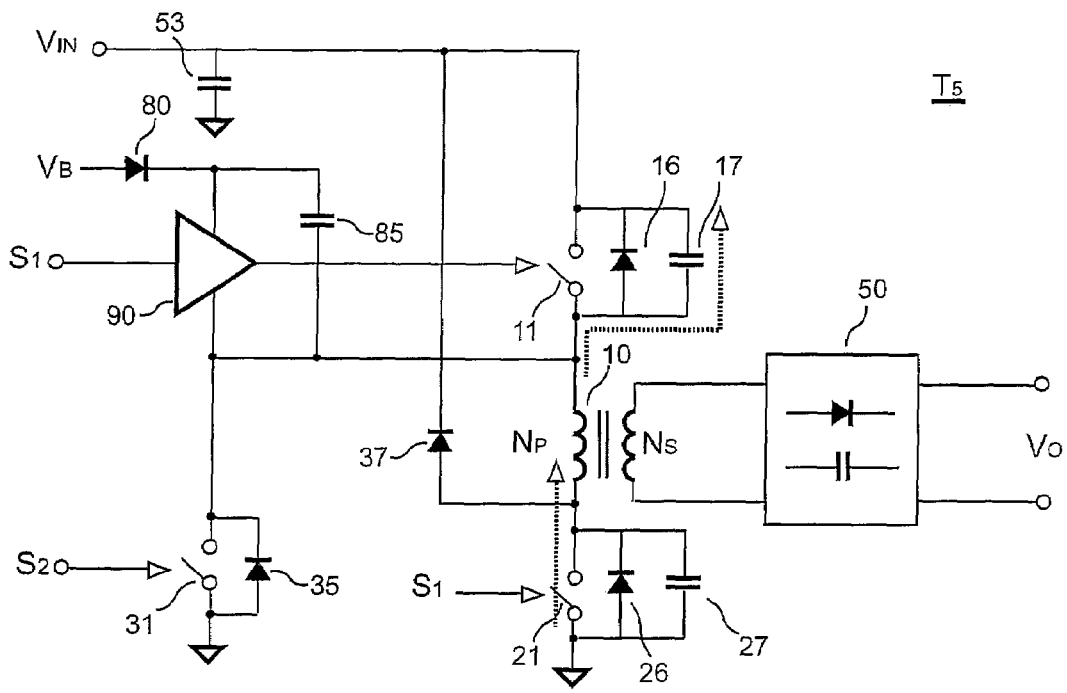

FIG. 3A-3E show operation stages of each switching cycle of the switching power converter. The transistor 11 and the transistor 21 are turned on during the operation stage $T_1$ as shown in FIG. 3A. The switching current $I_M$ is conducted to transfer the energy into the transformer 10. FIG. 3B shows the operation stage $T_2$, in which the transistor 11 and the transistor 21 are turned off. The energy of the leakage inductor and/or the magnetizing inductor of the transformer 10 will become a circular current to retrieve the energy to the input voltage $V_{IN}$ through the diode 37 and the diode 35. The transistor 31 is turned on at this moment to achieve the soft switching (zero voltage turn-on), as shown in FIG. 3C. During the operation stage $T_3$, the voltage of a capacitor 27 is equal to the input voltage $V_{IN}$. The capacitor 27 is the parasitic capacitor of the transistor 21. Besides, the supply voltage $V_B$ will charge the capacitor 85 via the diode 80 and the transistor 31 for the charge-pump. When the transformer 10 is fully discharged, the energy of the capacitor 27 will be delivered to the transformer 10 through the transistor 31 in the operation stage $T_4$, as shown in FIG. 3D. FIG. 3E is the operation stage $T_5$, in which the transistor 31 is turned off. Therefore, the energy of the transformer 10 will reverse charge to a capacitor 17 and the capacitor 27, which help the soft switching of transistors 11 and 21 in the next switching cycle. The capacitor 17 is the parasitic capacitor of the transistor 11.

Figure 4:
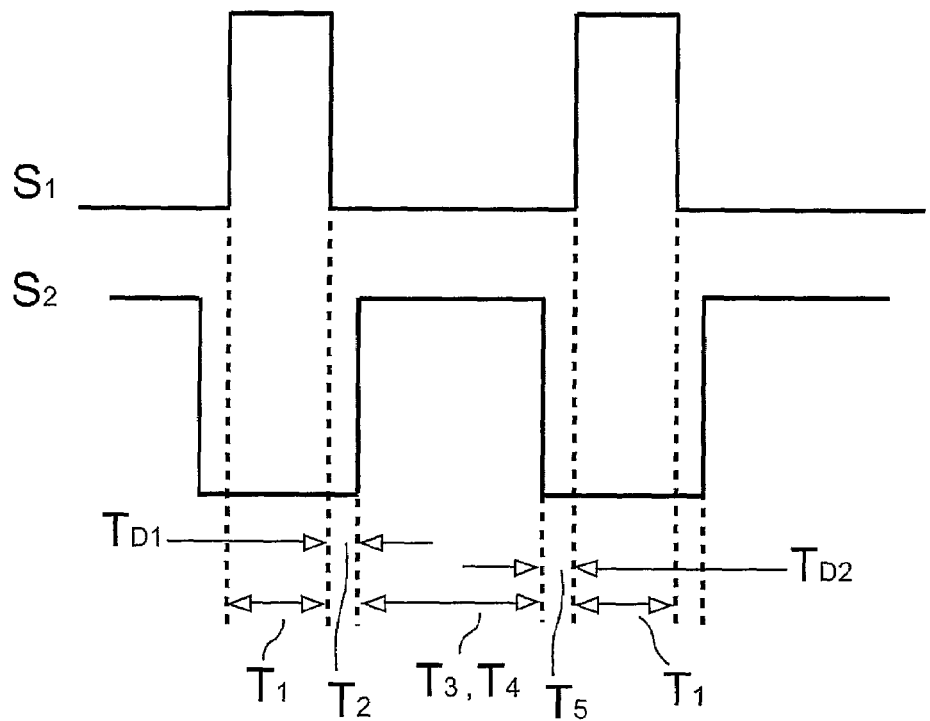
FIG. 4 shows waveforms of switching signals according to an embodiment of the present invention.

FIG. 4 shows the waveform of switching signals $S_1$ and $S_2$, in which a delay time $T_{D1}$ is generated after the switching signal $S_1$ is disabled and before the switching signal $S_2$ is enabled. Furthermore, a delay time $T_{D2}$ is generated after the switching signal $S_2$ is disabled and before the switching signal $S_1$ is enabled. The delay time $T_{D1}$ is the period of the operation stage $T_2$. The delay time $T_{D2}$ is the period of the operation stage $T_5$. The switching signal $S_1$ is coupled to drive the transistor 11 and the transistor 21 through the drive circuit 90 and the buffer circuit 95 respectively. The switching signal $S_2$ is connected to drive the transistor 31. The transistor 11 and the transistor 21 are driven with a first pulse width. The transistor 31 is driven with a second pulse width.

Figure 5:
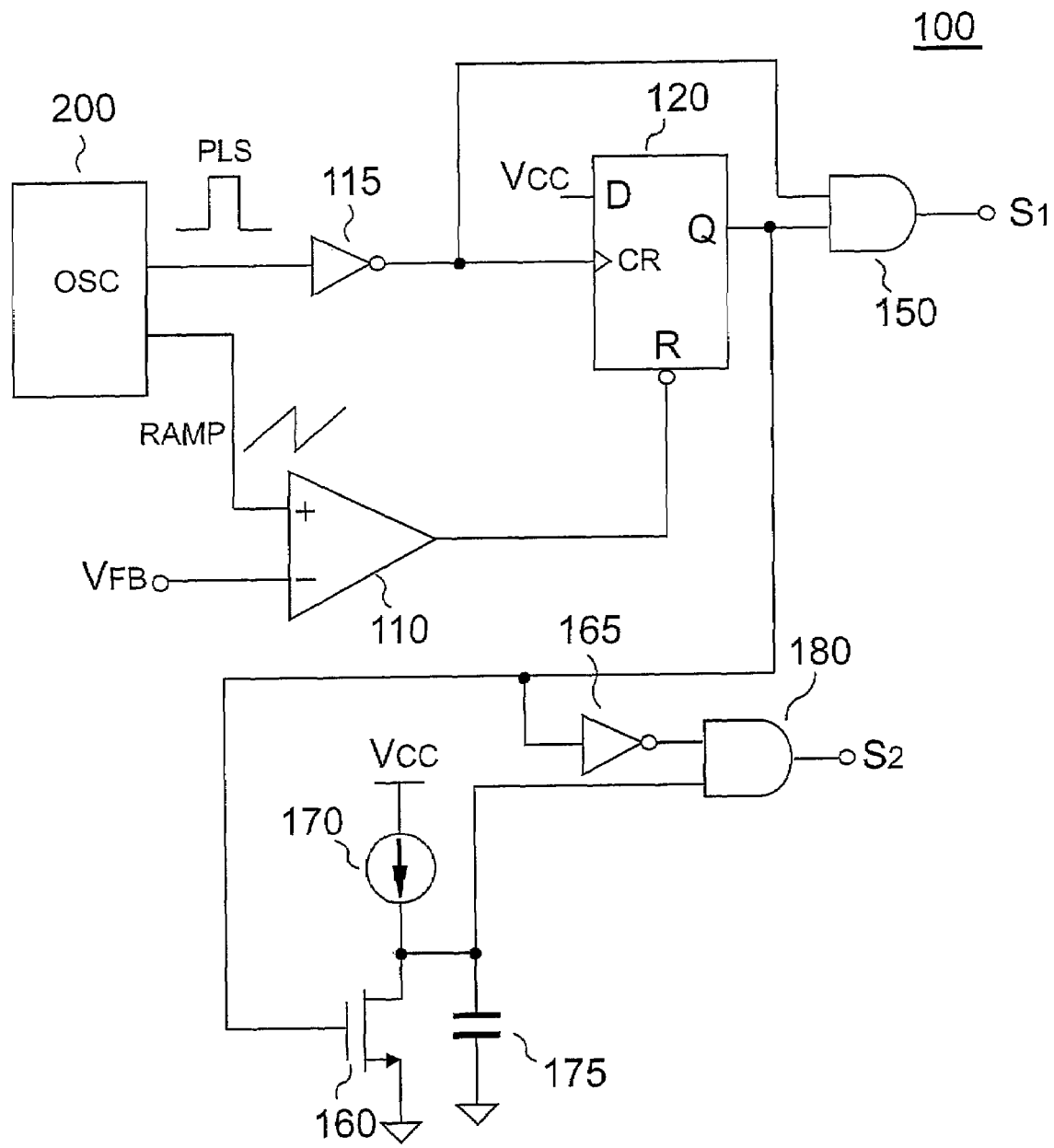
FIG. 5 is a switching control circuit of the switching power converter according to an embodiment of the present invention.

FIG. 5 is a switching control circuit 100 according to an embodiment of the present invention. The switching control circuit 100 includes an oscillation circuit 200 for generating a pulse signal PLS and a ramp signal RAMP. The pulse signal PLS is connected to an inverter 115. The output of the inverter 115 is connected to enable a flip-flop 120. The output of the flip-flop 120 is connected to the input of an AND gate 150. Another input of the AND gate 150 is connected to the output of the inverter 115. The output of the AND gate generates the switching signal $S_1$. The ramp signal RAMP and the feedback signal $V_{FB}$ are coupled to an operational amplifier 110. The output of the operational amplifier is applied to rest the flip-flop 120. A transistor 160, a current source 170 and a capacitor 175 develop a delay circuit. The input of the transistor 160 is connected to the output of the flip-flop 120. The capacitor 175 is connected to the input of an AND gate 180. Another input of the AND gate 180 is coupled to the output of the flip-flop 120 via an inverter 165. The output of AND gate 180 generates the switching signal S2. The current of the current source 170 and the capacitance of the capacitor 175 determine the delay time $T_{D1}$.

Figure 6:
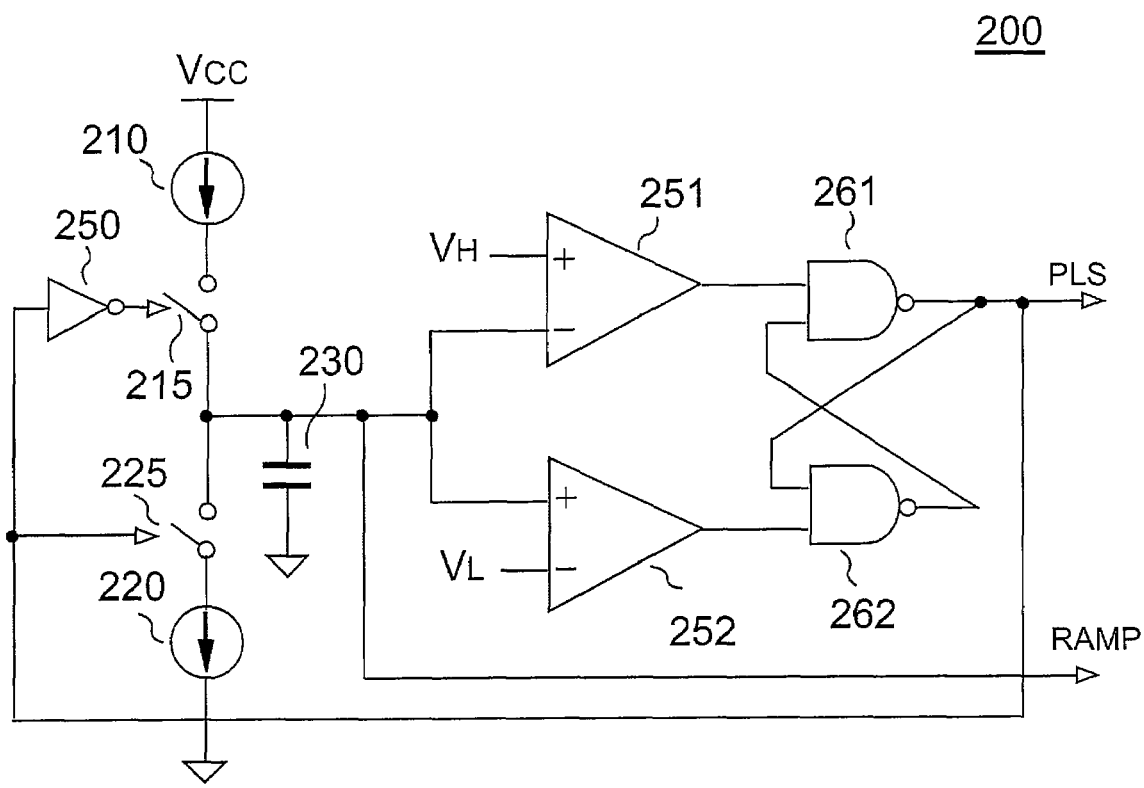
FIG. 6 shows a schematic view of a circuit of an oscillation circuit according to an embodiment of the present invention.

FIG. 6 shows a schematic view of the oscillation circuit 200 according to an embodiment of the present invention. A current source 210 is connected to a capacitor 230 through a switch 215. A current source 220 is connected to the capacitor 230 via a switch 225. A comparator 251 having a reference voltage $V_H$ is connected to the capacitor 230. A comparator 252 having a reference voltage $V_L$ is connected to the capacitor 230. NAND gates 261 and 262 develop a latch circuit. The input of the NAND gate 261 is connected to the output of the comparator 251. The input of the NAND gate 262 is connected to the output of the comparator 252. The output of the NAND gate 261 generates the pulse signal PLS. The switch 225 is controlled by the pulse signal PLS. The switch 250 is controlled by the pulse signal PLS through an inverter 250. The ramp signal RAMP is therefore generated at the capacitor 230. Additionally, the current of the current source 220 and the capacitance of the capacitor 230 determine the pulse width of the pulse signal PLS and the delay time $T_{D2}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching power converter, comprising:
   a transformer, comprising a primary winding having a first terminal and a second terminal, a secondary winding being coupled to an output of the switching power converter;
   a first transistor, connected from an input voltage to the first terminal of the primary winding;
   a second transistor, connected from the second terminal of the primary winding to a ground;
   a drive circuit, coupled to the first terminal of the primary winding and the first transistor for driving the first transistor;
   a charge pump circuit, connected to the drive circuit to provide a power source to the drive circuit, comprising a capacitor and a charge-pump diode, wherein the capacitor is connected to the drive circuit, and the charge-pump diode is connected from a supply voltage to the capacitor;
   a diode, connected from the second terminal of the primary winding to the input voltage;
   a third transistor, coupled from the first terminal of the primary winding to the ground; and
   a switching control circuit, coupled to the output of the switching power converter to generate switching signals for regulating the switching power converter,
   wherein the switching signals include a first switching signal and a second switching signal, the first switching signal is coupled to drive the first transistor and the second transistor, the second switching signal is coupled to drive the third transistor, and the supply voltage charges the capacitor through the charge-pump diode when the third transistor is turned on.

2. The switching power converter as claimed in claim 1, wherein the switching control circuit generates a first delay time after the first switching signal is disabled and before the second switching signal is enabled, and wherein the switching control circuit generates a second delay time after the second switching signal is disabled and before the first switching signal is enabled.

3. The switching power converter as claimed in claim 1, wherein the first transistor and the second transistor are driven with a first pulse width and the third transistor is driven with a second pulse width.

4. The switching power converter as claimed in claim 1, further comprising a second diode coupled from the ground to the first terminal of the primary winding.

5. The switching power converter as claimed in claim 1, further comprising a buffer circuit connected to the second transistor for driving the second transistor.

6. A switching power converter, comprising:

a transformer;

a first transistor, connected from an input voltage to the transformer;

a second transistor, connected from the transformer to a ground;

a drive circuit, coupled to the first transistor for driving the first transistor;

a buffer circuit, connected to the second transistor for driving the second transistor;

a charge pump circuit, connected to the drive circuit to provide a power source to the drive circuit, comprising a capacitor and a charge-pump diode, wherein the capacitor is connected to the drive circuit, and the charge-pump diode is connected from a supply voltage to the capacitor;

a first diode, connected from the transformer to the input voltage;

a second diode, coupled from the ground to the transformer; and a switching control circuit, coupled to an output of the switching power converter to generate a switching signal for regulating the switching power converter;

wherein the switching signal is coupled to the drive circuit and the buffer circuit for driving the first transistor and the second transistor, in which the first transistor and the second transistor are driven with a pulse width, and the supply voltage charges the capacitor through the charge-pump diode when the first and second transistors are turned off.

* * * * *